United States Patent US 7,900,255 B1
Mayr et al. (45) Date of Patent: Mar. 1, 2011

(54) PATTERN MATCHING SYSTEM, METHOD AND COMPUTER PROGRAM PRODUCT (75) Inventors: Johannes Mayr, Linz (AT); Thomas C. H. Steiner, Linz (AT); Manuel Nedbal, Haag (AT)

(73) Assignee: McAfee, Inc., Santa Clara, CA (US)

( * ) Notice: Subject to any disclaimer, the term of this patent is extended or adjusted under 35 U.S.C. 154(b) by 1033 days.

(21) Appl. No.: 11/253,236

(22) Filed: Oct. 18, 2005

(51) Int. Cl.
*G06F 11/00* (2006.01)
*G06F 11/30* (2006.01)

(52) U.S. Cl. .......................................... 726/23; 713/188

(58) Field of Classification Search ............... 726/23, 726/22; 713/188; 382/181, 193, 199, 218
See application file for complete search history.

(56) References Cited

U.S. PATENT DOCUMENTS

| 6,725,377 | B1 | 4/2004 | Kouznetsov | 713/201 |
| 6,789,202 | B1 | 9/2004 | Ko et al. | 713/201 |
| 6,851,061 | B1 | 2/2005 | Holland, III et al. | 713/201 |
| 7,110,540 | B2 * | 9/2006 | Rajagopal et al. | 380/44 |
| 7,134,143 | B2 * | 11/2006 | Stellenberg et al. | 726/25 |
| 7,290,282 | B1 * | 10/2007 | Renert et al. | 726/24 |
| 2003/0229710 | A1 * | 12/2003 | Lie et al. | 709/231 |
| 2004/0083384 | A1 | 4/2004 | Hypponen | 713/200 |

* cited by examiner

*Primary Examiner* — Michael Pyzocha
*Assistant Examiner* — Ali S Abyaneh
(74) *Attorney, Agent, or Firm* — Zilka-Kotab, PC (57) ABSTRACT

A pattern matching system, method and computer program product are provided. In use, a plurality of components of data is received, such that each component of the data is compared against a plurality of patterns. To this end, more than one match between the components of the data and the patterns can be identified.

18 Claims, 5 Drawing Sheets

PATTERN MATCHING SYSTEM, METHOD AND COMPUTER PROGRAM PRODUCT

FIELD OF THE INVENTION

The present invention relates to pattern matching, and more particularly to increasing the efficiency of pattern matching.

BACKGROUND

Pattern matching is utilized by a wide variety of applications in both security and non-security-related environments. In the realm of security-related applications, pattern matching has been used to combat intrusion attacks. Intrusion attacks on computer networks are a major problem in today's networked computing environment. An intrusion attack occurs when an intruder either breaches a network and/or computer, or at least temporarily has an unwanted influence on it.

A variety of intrusion detection systems (IDSs) have been developed to detect and moreover prevent intrusion attacks. In order to detect intrusion attacks, IDSs typically include an intrusion scanning engine with one or more files known as attack signature files, which contain patterns pertaining to known types of intrusion attacks. Using such attack signature files, IDSs examine packets that pass on a network and attempt to identify the various patterns of known attacks. When an IDS detects characteristics of a known intrusion attack, a system administrator is typically notified along with any other desired response.

IDSs typically require near real-time testing for the presence of thousands of patterns in network packets. Sequential scanning of each network packet for pattern matches is far too slow for achieving desired throughput. Thus, state of the art IDSs either use hardware accelerated pattern matching devices, a costly solution, or utilize string search algorithms, such as Boyer-Moore.

In any case, to further maintain the desired throughput, traditional IDSs utilize pattern matching systems which stop after having detected a first pattern match. When stopped, the scanning is terminated and a desired response to such first pattern match is carried out, without scanning for any remaining untested patterns. Unfortunately, this early termination of the scanning results, in some situations, in fewer than all possible matches (and associated response, etc.).

There is thus a need for overcoming these and/or other problems associated with the prior art.

SUMMARY

A pattern matching system, method and computer program product are provided. In use, a plurality of components of data is received, such that each component of the data is compared against a plurality of patterns. To this end, more than one match between the components of the data and the patterns can be identified.

DETAILED DESCRIPTION

Figure 1:
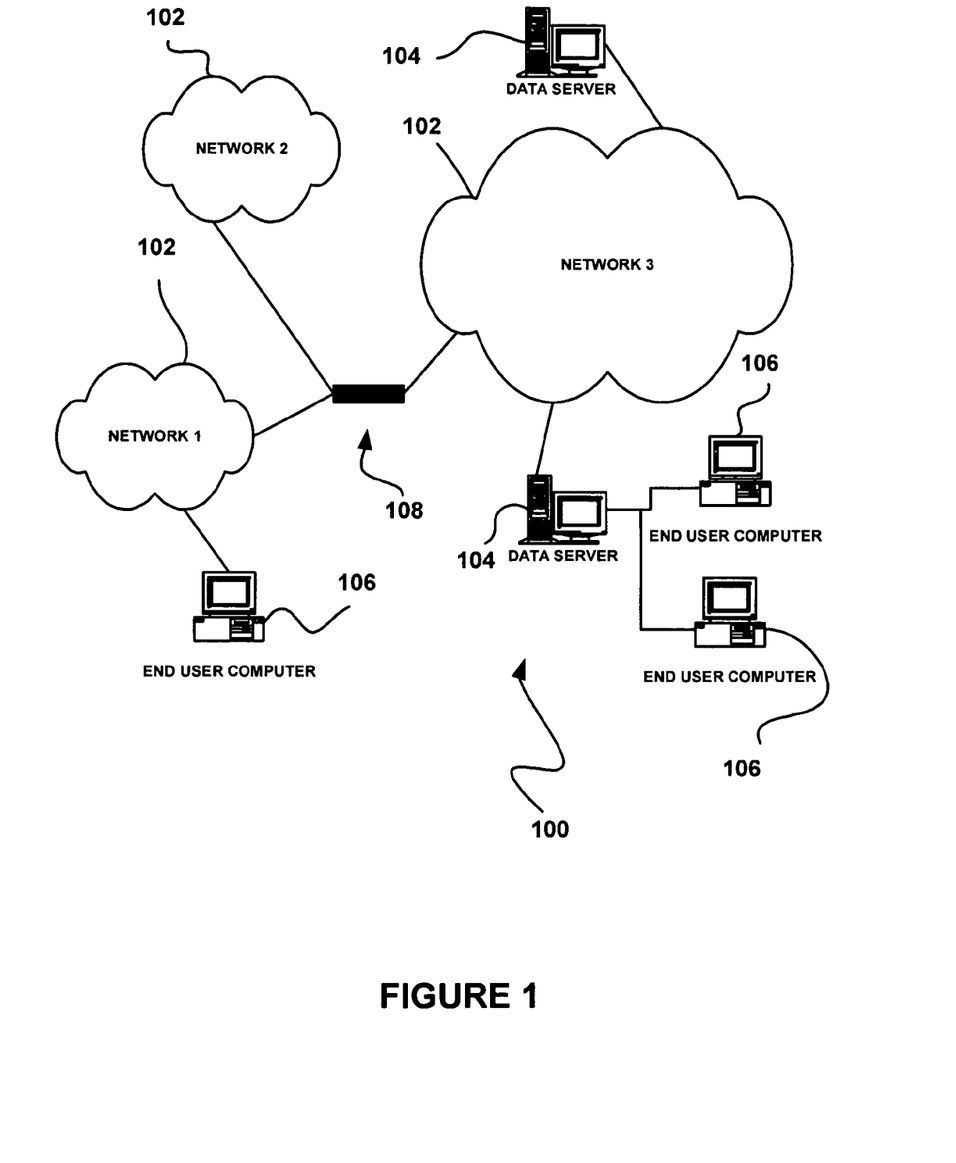
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, etc.

Coupled to the networks 102 are data server computers 104 which are capable of communicating over the networks 102. Also coupled to the networks 102 and the data server computers 104 is a plurality of end user computers 106. Such data server computers 104 and/or client computers 106 may each include a desktop computer, lap-top computer, hand-held computer, mobile phone, hand-held computer, peripheral (e.g. printer, etc.), any component of a computer, and/or any other type of logic. In order to facilitate communication among the networks 102, at least one gateway or router 108 is optionally coupled therebetween.

It should be noted that any of the foregoing network devices in the present network architecture 100, as well as any other unillustrated hardware and/or software, may be equipped with various pattern matching features. For example, the various data server computers 104 and/or end user computers 106 may be equipped with a pattern matching technique for comparing each component of data against a plurality of patterns, such that more than one match is identified between the components of the data and the patterns. More information regarding optional functionality and optional architectural components associated with such feature will now be set forth for illustrative purposes.

Figure 2:
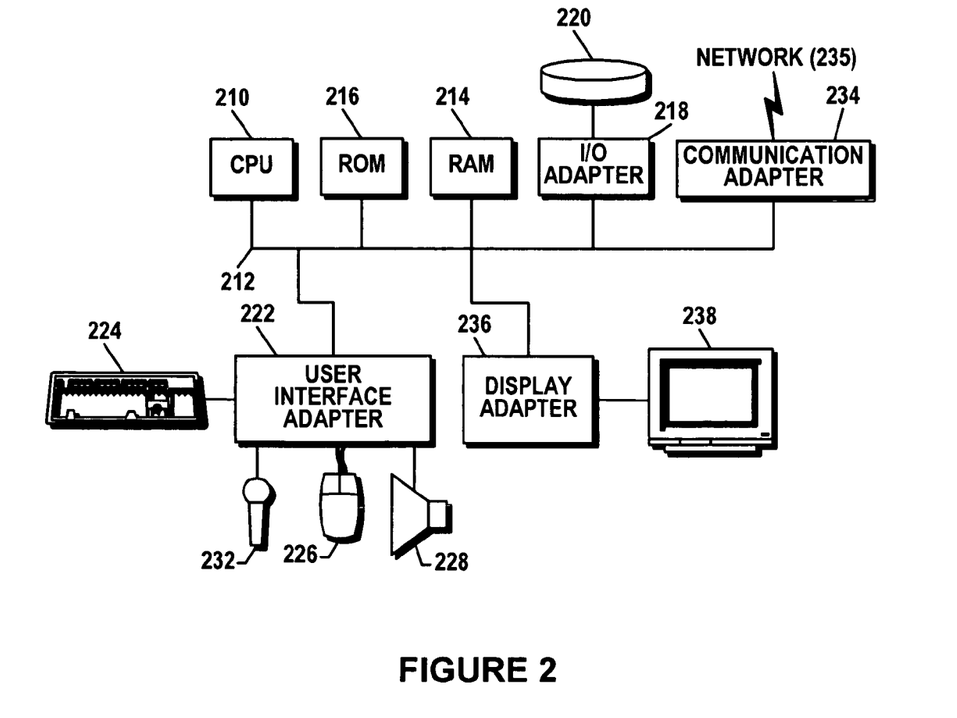
FIG. 2 shows a representative hardware environment that may be associated with the data server computers and/or end user computers of FIG. 1, in accordance with one embodiment.

FIG. 2 shows a representative hardware environment that may be associated with the data server computers 104 and/or end user computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
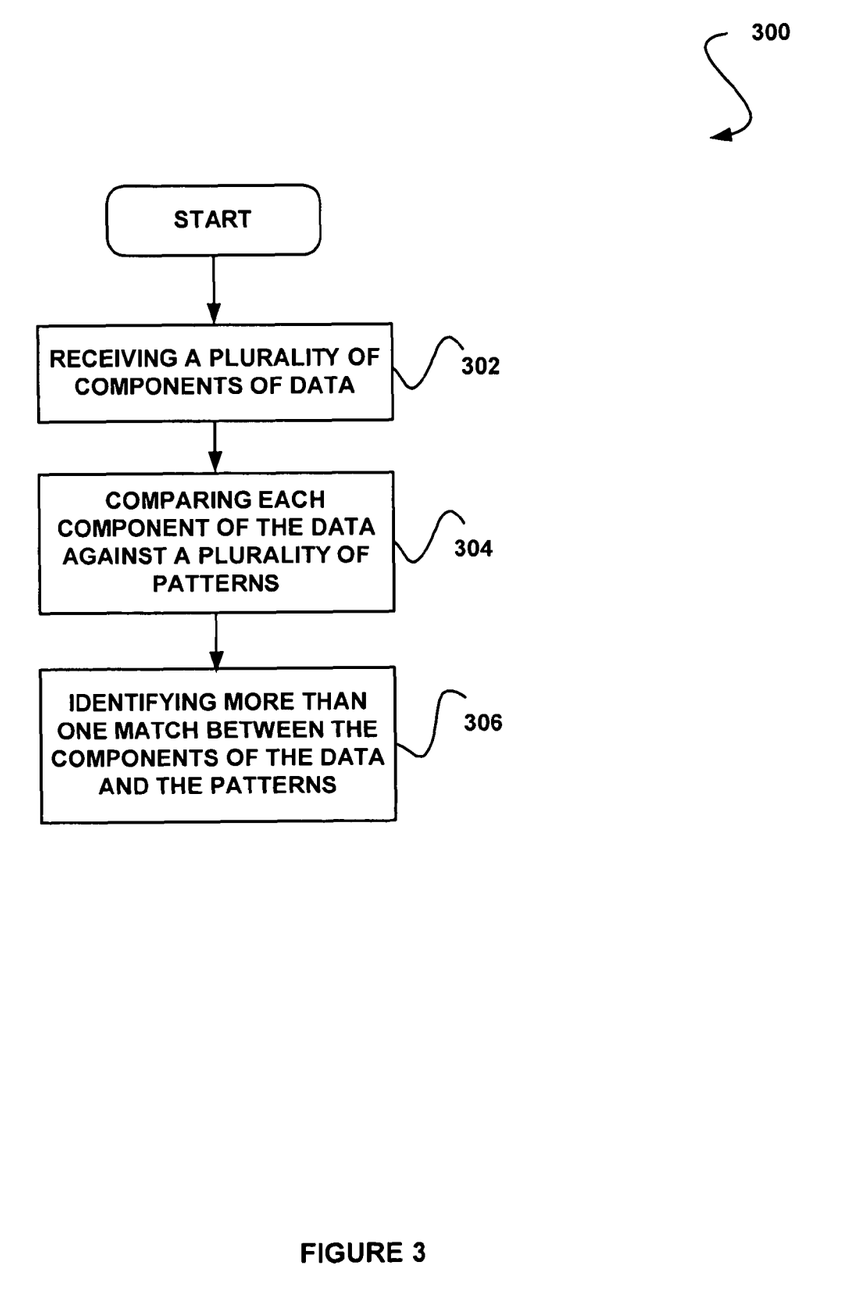
FIG. 3 shows a method for pattern matching, in accordance with one embodiment.

FIG. 3 shows a method 300 for pattern matching, in accordance with one embodiment. As an option, the present method 300 may be implemented in the context of the architecture and environment of FIGS. 1 and/or 2. Of course, however, the method 300 may be carried out in any desired environment.

As shown, a plurality of components of data is received in operation 302. In the context of the present description, the data may include any computer readable information and the components may include any character, word, string, number of bits (e.g. byte), and/or any other portion of the data. Still yet, the data may be received via a network, from another local sub-system, and/or in any other desired manner.

Next, in operation 304, each component of the data is compared against a plurality of patterns. Each pattern may include one or more components, which each include any predetermined character, word, string, token, key, number of bits (e.g. byte), and/or any other portion of potentially received data that may exist, and/or further be of interest. In one embodiment, such pattern may be representative of unwanted activity or even an intrusion attack (e.g. network intrusion, computer intrusion, etc.) in the context of a security system. Of course, it is also contemplated that the patterns may represent non-security-related activity.

To this end, the method 300 may operate such that more than one match is identified between the components of the data and the patterns. Note operation 306. For example, in one embodiment, the aforementioned comparison of operation 304 may be continued subsequent to or in parallel with a first pattern match, so that multiple matches are identified. In another embodiment, the method 300 may even continue until substantially all possible pattern matches have been identified and reported.

By this design, the present method 300 is capable of providing a more comprehensive set of pattern matching results. Further, in an optional embodiment where different pattern matches prompt a different response (e.g. see Table 1 below, for example), the present method 300 may optionally ensure that each of the different responses (i.e. a complete set) are carried out, by not stopping at a single pattern match and associated response.

TABLE 1

| Pattern match_1 | Response_1 |
| Pattern match_2 | Response_2 |
| Pattern match_3 | Response_3 |

In the context of the aforementioned security embodiment, the different pattern matches may each represent different types of intrusions (e.g. system compromise, distributed denial of service attack, Trojan, zombie, worm, etc.), and the responses (e.g. disconnect network, alert administrator, block port, etc.) may be tailored thereto. Again, however, it should be noted that it is also contemplated that such technique may be equally applicable to non-security-related environments.

In one optional embodiment, a particular data structure of patterns and associated technique may be provided for improving an overall efficiency of the pattern matching comparison algorithm, thus further making it feasible to identify more than one (and even substantially all) pattern matches. More illustrative information will now be set forth regarding such optional features with which the foregoing method 300 may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
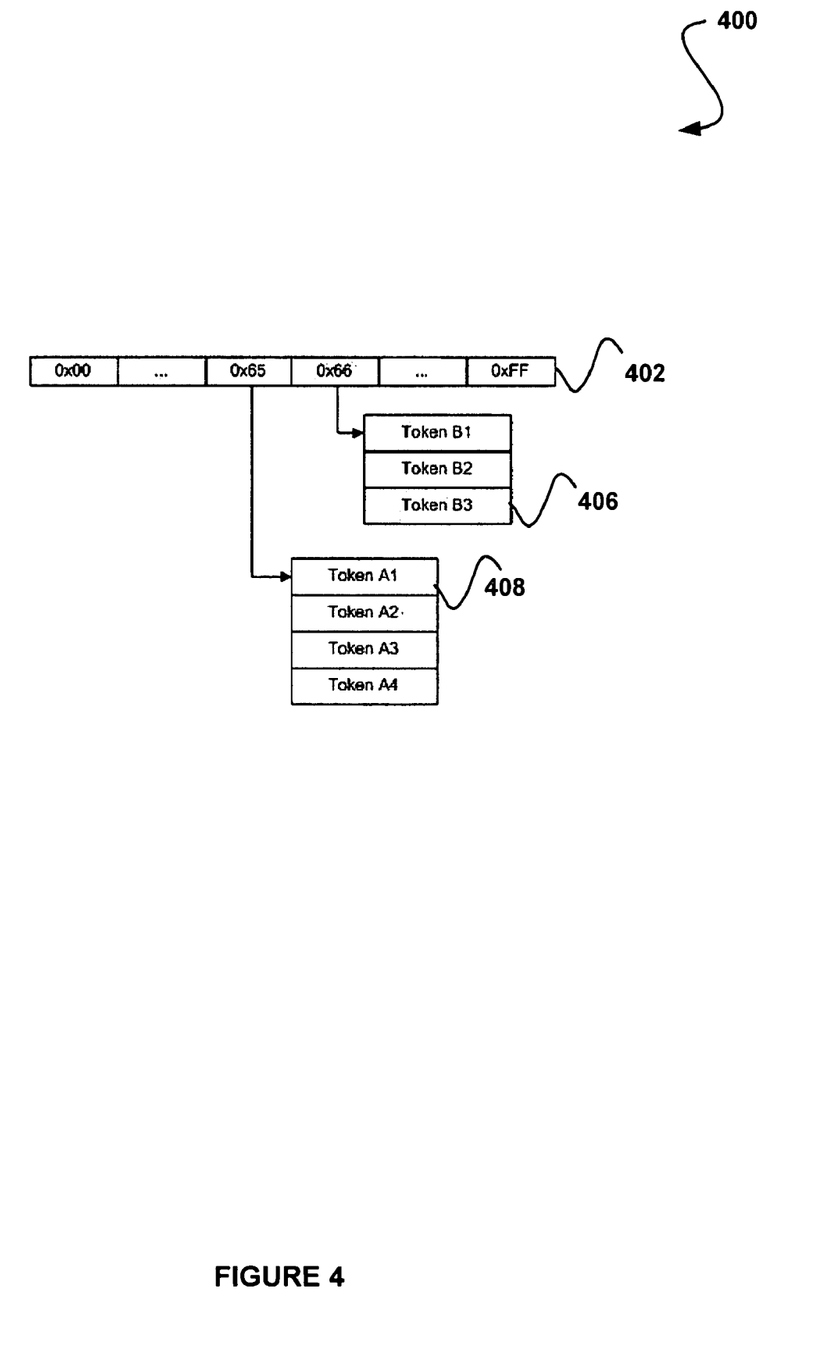
FIG. 4 illustrates a data structure for use during pattern matching, in accordance with another embodiment.

FIG. 4 shows a data structure 400 for use during pattern matching, in accordance with another embodiment. As an option, the present data structure 400 may be implemented in the context of the architecture and environment of FIGS. 1-3. Of course, however, the data structure 400 may be carried out in any desired environment.

As shown, the data structure 400 includes a plurality of indices 402. Further, each index 402 correlates with a list of stored patterns 406, 408. As an option, a character associated with each index 402 is the same as a first character of each of the patterns 406, 408 in the corresponding list. Table 2 illustrates an example of a couple of indices and associated lists of patterns. Of course, such table is set forth for illustrative purposes and should not be construed as limiting in any manner whatsoever.

TABLE 2

| Index | Patterns |
| --- | --- |
| O | OM |
|   | OU |
| U | UY |
|   | UT |
|   | UXE |
|   | UTER |

In use, the data structure 400 may optionally be used when comparing the patterns against data components (e.g. see, for example, operation 304 of FIG. 3, etc.), for improving processing efficiency. More information regarding one exemplary technique in which the data structure 400 may be used in such a capacity will be set forth during reference to FIG. 5.

In one embodiment, the patterns in the list may optionally be prioritized based on various factors such as a length of the patterns. For example, patterns of shorter length may be listed prior to patterns of longer length. As will soon become apparent, the data components may be compared against the patterns of specific lists only, for efficiency purposes.

Figure 5:
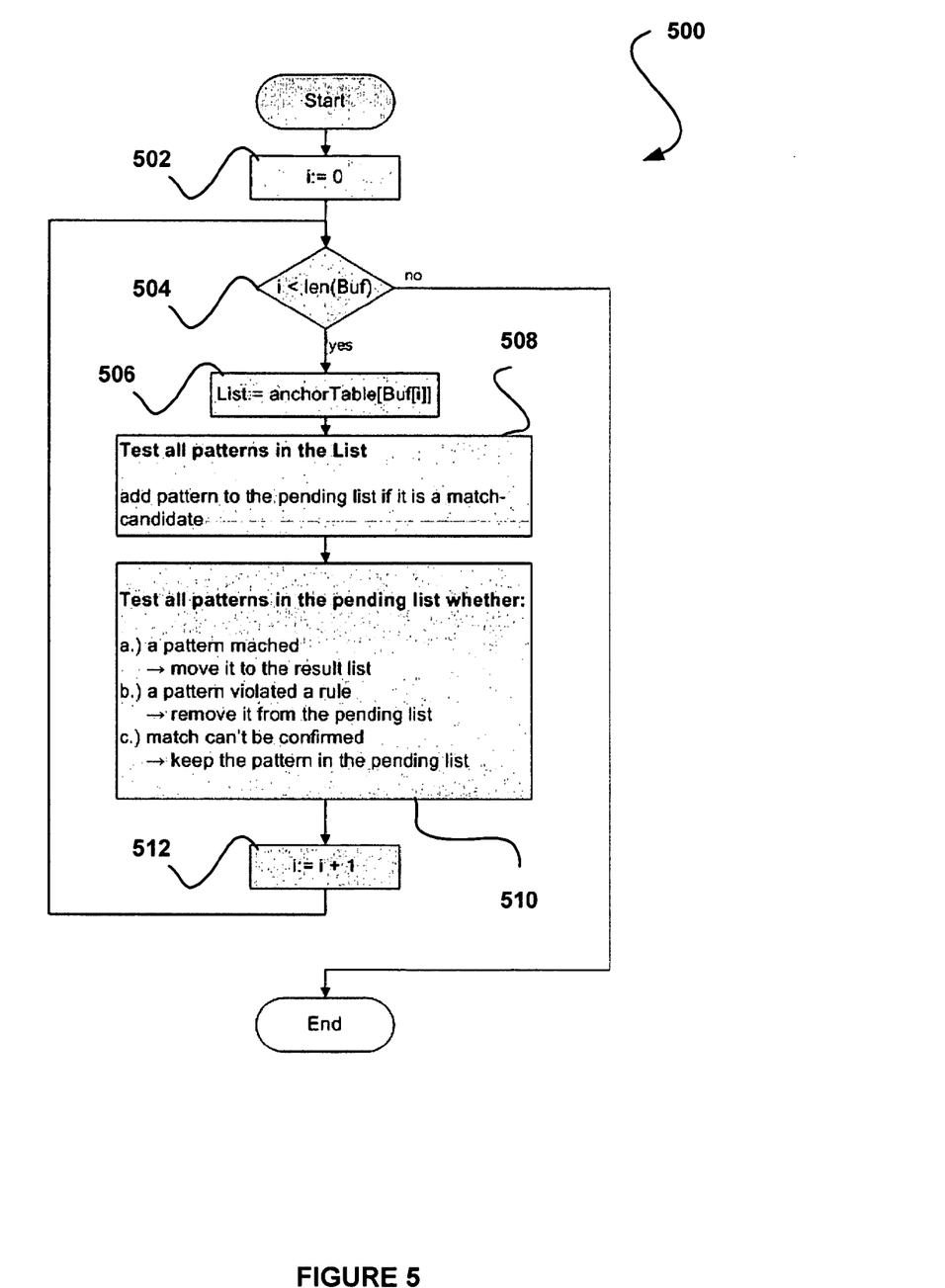
FIG. 5 shows a method for efficient pattern matching using the data structure of FIG. 4, in accordance with one embodiment.

FIG. 5 shows a method 500 for efficient pattern matching using the data structure 400 of FIG. 4, in accordance with one embodiment. Of course, however, it should be noted that the method 500 may be carried out in any desired environment using other data structures, etc.

As shown, a variable (i) is initialized as zero in operation 502. For reasons that will soon become apparent, it is then determined whether such variable is less than a length of a buffer containing a plurality of components of data. See decision 504. In use, such buffer may be utilized for storing incoming data received via a network or via any other framework.

If, at any time, it is found that the variable is not less than the length of such buffer containing the data components, such provides an indication that all of the components of data in the buffer have been tested, after which the present method 500 may be terminated. Prior to such termination, the following operations are repeated for each component of data, for the purpose of comparing the same against the appropriate patterns.

This is first accomplished by identifying an appropriate list of patterns to test against the present component of data. This is carried out by utilizing the component of data itself as an index into the data structure 400 of FIG. 4. See operation 506.

In other words, the index that matches the current component is first identified, after which the list of patterns associated with the matched index is retrieved. In one example where the buffer string is "COMPUTER," the current component is "U," and the data structure includes that in Table 2, the current list of patterns identified in operation 506 would include "UY," "UT," "UXE" and "UTER."

Next, in operation 508, each pattern in the current list is compared with respect to the current data component. In particular, the comparison of operation 508 involves both a first and last component of each pattern in the list identified in operation 506. Further, since the current data component was used to look up the appropriate list of patterns (and thus the first component of each pattern inherently represents a match), the only pattern component that need be compared in operation 508 is the last component. Of course, another component of the pattern (other than the first and last) may be utilized in operation 508.

Thus, in the context of the previous example, it would be found that, while of course the first component of each pattern ("U") matches the current data component, only the last component of the patterns "UT," "UXE," and "UTER" matches the corresponding data component of the string "COMPUTER." To this end, all of the patterns in the current list, except for the pattern "UY," would be eligible to be added to the first pending list.

It should be noted, however, that in cases where a pattern consists of only two components, it is not necessary to add such pattern to the first pending list, since the foregoing comparison would establish the same as a complete match or not. Thus, in the context of the present example, the patterns "UXE" and "UTER" would be added to the first pending list, and only the pattern "UT" would be added to a second result list, including only complete matches.

To this end, a first pending list may be established by including patterns that are at least potentially matched against the component of the data (i.e. where only a portion of the pattern is matched, etc.). As an option, the first pending list may take the form of a linked list. Further, as mentioned earlier, the patterns in the list may optionally be prioritized based on various factors, such as a length of the patterns, etc. To this end, as is now apparent, the data components may be compared against the patterns of each list based on such prioritization, for efficiency purposes.

Next, in operation 510, all of patterns in the first pending list may be tested against the current component to determine eligibility to either remain in the first pending list, be removed from the first pending list, or be added to the second result list.

As is now readily apparent, various previously tested patterns would have been added to the first pending list, since at least a portion of the components in such patterns have already been matched. In order to ensure that the appropriate character of a previously stored pattern in the first pending list is compared against the current data component, an index or offset value may be tracked with respect to each pattern in the first pending list. Such index or offset may be altered (e.g. incremented by one, etc.) after each iteration of the method 500 to track a current location in each of the patterns in the first pending list.

Thus, in one possible scenario, a pattern in the first pending list may be included in the second result list if it is determined, based on a match of the current data component, that the pattern is completely matched against the components of the data (i.e. all components of the data and pattern match). In other words, if a last component of a pattern is matched in operation 510, it is stored in the second result list. Of course, since the final component of each pattern would have already been determined to be a match in order for such pattern to be included in the first pending list (note operation 508 above), the aforementioned last component may actually refer to a second-to-final component.

In another possible scenario, a pattern in the first pending list may be removed from the first pending list upon violating a rule. For example, if it is determined that the current data component does not match the current corresponding component of the associated pattern, it may be concluded that such pattern is incapable of a complete match. Thus, such pattern may be removed from the first pending list to avoid unnecessary processing in subsequent iterations of method 500.

In still yet another possible scenario, a pattern in the first pending list may be maintained in the first pending list if it can not be confirmed that the pattern is completely matched against the components of the data. For example, if the current data component is successfully compared to the corresponding component of the pattern (where such pattern component is not the last), the pattern may be maintained in the first pending list for further processing.

Finally, the variable (i) is incremented in operation 512 to afford the appropriate number of iterations of operations 504-510, as set forth above.

Table 3 illustrates an example of the various scenarios associated with operation 510 in the specific context of the abovementioned example. Of course, such table is set forth for illustrative purposes and should not be construed as limiting in any manner whatsoever.

TABLE 3

| Buffer: COMPUTER |
| --- |
| Iteration #1 ("C") |
| First pending list<br>N/A<br>Second result list<br>N/A<br>Iteration #2 ("O") |
| First pending list<br>Second result list<br>OM<br>Iteration #3 ("M") |
| First pending list<br>Second result list<br>OM<br>Iteration #4 ("P") |
| First pending list<br>Second result list<br>OM<br>Iteration #5 ("U") |
| First pending list<br>UXE (index = 1)<br>UTER (index = 1)<br>Second result list<br>OM<br>UT<br>Iteration #6 ("T") |
| First pending list<br>UTER (index = 2)<br>Second result list<br>OM<br>UT<br>Iteration #7 ("E") |
| First pending list<br>UTER (index = 3) |

TABLE 3-continued

Buffer: COMPUTER

Second result list
OM
UT
Iteration #8 ("R")

First pending list
Second result list
OM
UT
UTER

By this design, each component of the data is compared with a particular pattern only once, thus allowing for more efficient operation.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
receiving a plurality of components of data;
comparing each component of the data against a plurality of patterns, utilizing a micro-processor, wherein the patterns are representative of intrusion attacks;
establishing a first list including patterns that are potentially matched against the components of the data, wherein the patterns are determined to be potentially matched upon a first identification of a match between a portion of the plurality of components of the data and a portion of a plurality of portions of the patterns; and
identifying more than one complete match between the components of the data and each of the plurality of portions of the patterns in the first list;
wherein in response to the identification of a complete match between the plurality of components of the data and one or more of the patterns in the first list, each pattern on the first list for which a complete match is identified is moved from the first list to a second list;
wherein each component of the data is compared against each pattern of the plurality of patterns only once;
wherein one or more of the patterns are determined to be completely matched to the plurality of components of data upon a match between all of the plurality of components of the data and each of the plurality of portions of the pattern.

2. The method of claim 1, wherein one of the patterns is potentially matched against the components of the data when only one of the plurality of portions of the pattern is matched.

3. The method of claim 1, wherein the first list includes a linked list.

4. The method of claim 1, wherein the patterns in the first list are removed from the first list upon violating a rule.

5. The method of claim 1, wherein the patterns in the first list are maintained in the first list if it can not be confirmed that each of the plurality of portions of the patterns are completely matched against the components of the data.

6. The method of claim 1, wherein the comparing utilizes a data structure for storing the patterns.

7. The method of claim 6, wherein the data structure includes a plurality of indices.

8. The method of claim 7, wherein each index correlates with a list of patterns.

9. The method of claim 8, wherein a character associated with the index is the same as a first character of each of the patterns in the list.

10. The method of claim 8, wherein the patterns in the list are prioritized.

11. The method of claim 10, wherein the patterns in the list are prioritized based on a length thereof.

12. The method of claim 10, wherein the comparing is carried out based on the prioritization.

13. The method of claim 10, wherein patterns of shorter length are listed prior to patterns of longer length.

14. The method of claim 1, wherein the second list only, includes the plurality of portions of the patterns that are complete matches.

15. The method of claim 1, further comprising tracking, using at least one offset value, each pattern in the first list to ensure that an appropriate portion of each pattern is compared against each component of data.

16. The method of claim 1, wherein the comparing each component of the data includes first determining if a first portion and a last portion of each of the plurality of patterns matches a corresponding data component of the plurality of components of data.

17. A computer program product embodied on a non-transitory computer readable medium, comprising:
computer code for receiving a plurality of components of data;
computer code for comparing, utilizing a hardware processor, the components of the data against a plurality of patterns, wherein the patterns are representative of intrusion attacks;
computer code for establishing a first list including patterns that are potentially matched against the components of the data, wherein the patterns are determined to be potentially matched upon a first identification of a match between a portion of the plurality of components of the data and a portion of a plurality of portions of the patterns; and
computer code for identifying more than one complete match between the components of the data and each of the plurality of portions of the patterns in the first list;
wherein the computer program product is operable such that in response to the identification of a complete match between the plurality of components of the data and one or more of the patterns in the first list, each pattern on the first list for which a complete match is identified is moved from the first list to a second list;
wherein each component of the data is compared against each pattern of the plurality of patterns only once;
wherein the computer program product is operable such that one or more of the patterns are determined to be completely matched to the plurality of components of data upon a match between all of the plurality of components of the data and each of the plurality of portions of the pattern.

18. A system, comprising:
an intrusion detection system including a micro-processor coupled to a memory for comparing each component of data against a plurality of patterns, wherein the patterns are representative of intrusion attacks;
wherein the system is operable such that a first list is established including patterns that are potentially matched against the components of the data, wherein the patterns are determined to be potentially matched upon a first identification of a match between a portion of the plurality of components of the data and a portion of a plurality of portions of the patterns; and wherein the system is operable such that more than one complete match is identified between the components of the data and each of the plurality of portions of the patterns in the first list;

wherein the system is operable such that in response to the identification of a complete match between the plurality of components of the data and one or more of the patterns in the first list, each pattern on the first list for which a complete match is identified is moved from the first list to a second list;

wherein each component of the data is compared against each pattern of the plurality of patterns only once;

wherein the system is operable such that one or more of the patterns are determined to be completely matched to the plurality of components of data upon a match between all of the plurality of components of the data and each of the plurality of portions of the pattern.

* * * * *